Jan. 5, 1932. O. D. NUTTER 1,839,493
FISHING TOOL
Original Filed May 29, 1929
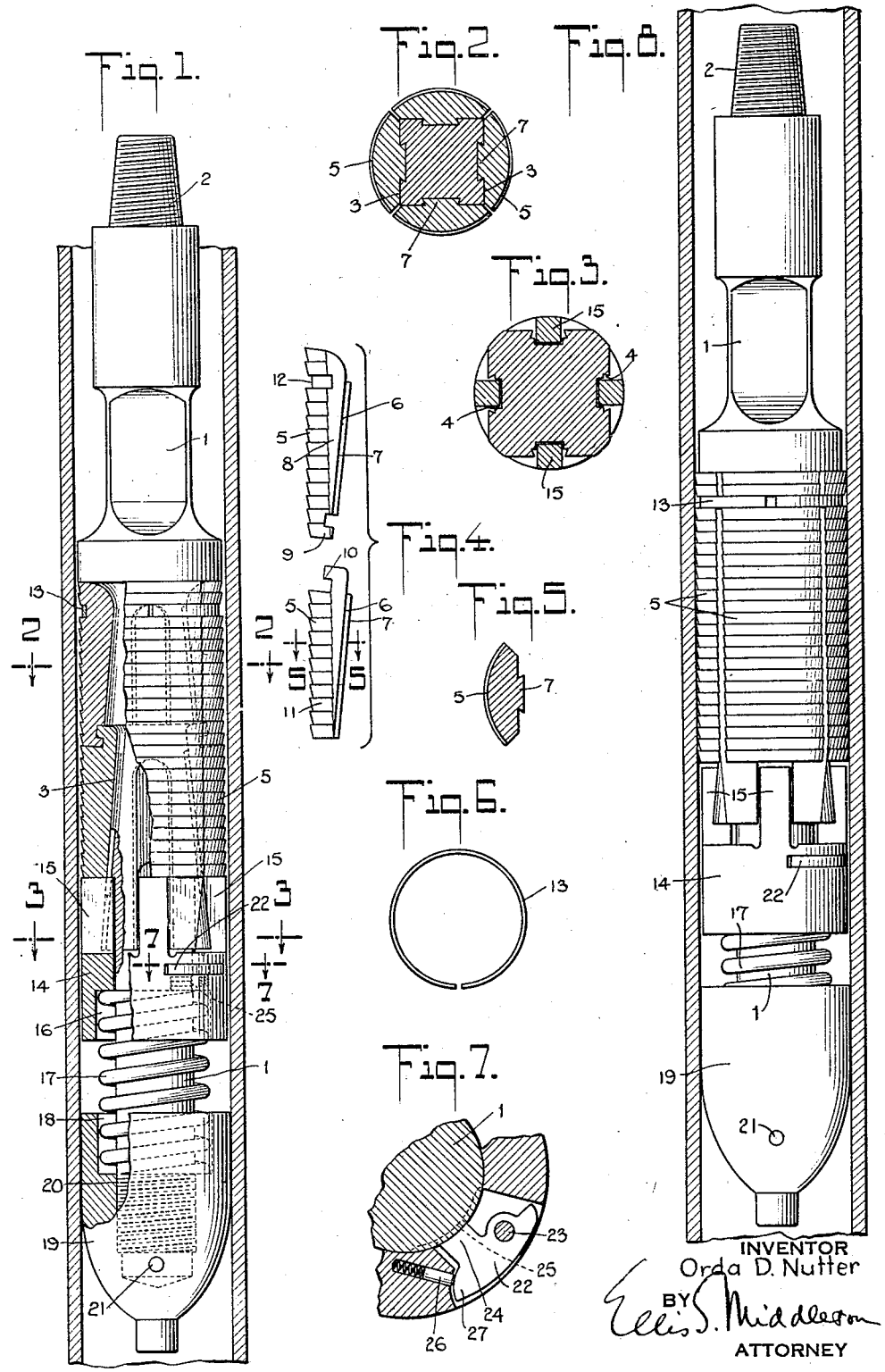
INVENTOR
Orda D. Nutter
BY Ellis S. Middleton
ATTORNEY Patented Jan. 5, 1932

1,839,493

UNITED STATES PATENT OFFICE

ORDA D. NUTTER, OF PARKERSBURG, WEST VIRGINIA, ASSIGNOR TO ACME FISHING TOOL COMPANY, OF PARKERSBURG, WEST VIRGINIA, A CORPORATION OF WEST VIRGINIA

FISHING TOOL

Application filed May 29, 1929, Serial No. 366,804. Renewed June 10, 1931.

This present invention relates to a fishing spear for lowering into a well to grip and remove, or adjust, a casing. As is common practice in this art, tools of this character are provided with a series of slips, serrated or toothed on their outer face, and so arranged that they may engage and bite into the inner periphery of a well casing, or be retracted against the tool body into an inoperative position for entry into a casing or for removal therefrom.

One of the important objects of this invention is the provision of a tool of the above type having slips of a maximum size and length to insure a large effective gripping area, but which will not be of such dimensions as to make manufacture difficult or expensive, such for instance as in the heat treating step incident to hardening the slips.

Another important object is to provide, in a tool of this type having a plurality of slips or a plurality of series of slips, means to insure their movement into operative or inoperative position, uniformly or simultaneously so as to equally distribute the strain accompanying the pulling or fishing of a casing.

With these and other objects in view, the invention consists in the provision of a tool body having a plurality of longitudinally arranged seats thereon, each of which is adapted to accommodate an independent slip, the slips of each longitudinal series being connected together and interlocking, the several series also being connected so that all the slips may move into and out of operative position uniformly and simultaneously.

The invention further consists in the novel arrangement, combination and construction of parts more fully hereinafter described and shown in the accompanying drawings which are merely illustrative of a preferred embodiment.

In these drawings:

Fig. 1 is an elevation of one form of the invention shown within a casing section with the slips in the inoperative position.

Fig. 2 is a sectional view along the line 2—2 of Fig. 1.

Fig. 3 is a similar view along the line 3—3 of Fig. 1.

Fig. 4 is a composite side elevation of two interlocking slips.

Fig. 5 is a sectional view along the line 5—5 of Fig. 4.

Fig. 6 is a plan detail of the tie ring.

Fig. 7 is an enlarged fragmentary sectional view through the push up ring showing the latch detail.

Fig. 8 is a view similar to that of Fig. 1 showing the parts in operative or casing engaging position.

Referring now to the embodiment illustrated, I have shown at 1 an elongated body having at the top thereof a tapered threaded portion 2 for attachment to a tool string.

The body 1 is provided with a plurality of series of slip seats, four series being shown and each series consisting of two seats, each seat comprising a substantially plane surface 3 arranged at an angle to the longitudinal axis of the body. The seats are all arranged at the same angle in order to insure equal and uniform radial movement of each slip as it moves down on its seat. Each seat is interrupted by a longitudinal dovetailed groove 4, and the lower seat of each series is provided with a slot the bottom of which is parallel to the body axis, all for a purpose to be specified hereinafter.

Individual slips are provided interlocked together to form a plurality of series. Fig. 4 illustrates an embodiment in which only two slips form a series although obviously any number may be similarly provided. All slips have an outer serrated face 5 adapted to engage and bite into the inner surface of a casing in their expanded position, an inclined plane face 6 at the rear thereof for engagement with a seat in the body and a projecting dovetailed portion 7 movable within the similarly shaped groove 4 in each seat. Thus each slip is freely movable in a longitudinal direction on its seat, yet its radial movement is limited to an extent which is an incident component of the longitudinal movement by reason of the angular relation of the seats.

The upper slip 8 is provided at the bottom with a portion 9 overlying and interlocking with a corresponding portion 10 at the top of the lower slip 11. Their manner of engagement is shown in Fig. 1. The upper slip has a curved top for abutment with an enlarged and similarly curved portion of the body, while the lower slip 11, abuts the body with the top of the engaging portion 10.

The drawings show the body as being provided with four sets or series of slips although the invention is not limited to this number.

In order to insure corresponding and equal movement of all the slip series, the top slip of each series is provided with a channel 12, to accommodate a split ring 13. This flexible tie ring permits the necessary expansion of the slips yet prevents one slip or series from sticking in one position while the remainder move either up or down as the case may be. As such, it constitutes means for insuring simultaneous movement of all slips.

Below the lower seats is a push up ring 14 surrounding the body and having fingers 15 extending upwardly and engaging the bottom of the lower slips 11, the fingers riding in their corresponding slots (Fig. 3). The bottom of the ring 14 is cut away as at 16 to accommodate the top of a coil spring 17 which surrounds the lower portion of the body, the other end of the spring being seated in a cavity 18 in the top of a cone nut 19 attached to the end of the body as by threads 20 and pin 21.

From Fig. 1, it will be seen that under action of the spring 17, the push up ring 14 will through engagement of its fingers 15 with the lower slips 11, push them up until the top of each slip abuts the body and the slips occupy a position free from the casing.

In order to permit the slips to drop down on their seats and thus expand against the inner periphery of the casing, means are provided for temporarily holding down the push up ring. This means may conveniently take the form of a latch member 22 operating within a slot in the ring 14 about a pivot pin 23 (Fig. 7). The latch proper is provided with a body engaging portion 24 having teeth preferably two in number adapted to engage with two of the three teeth 25, thus making two vertical positions into which the ring may be secured. This position will determine the initial expansion of the slips. After the slips once bite into the casing they may be made to move on their seats a greater distance in which event a spring pressed plunger 26 engaging the nose 27 of the latch 22 will cause the latch to be disengaged from the body and upon releasing the bite of the slips from the casing, the spring 17 will function and the slips pushed upwardly to the position of Fig. 1.

In the operation of the assembled device, the ring 14 is pulled down against the spring 17 in any desired manner until the latch 22 may be pushed into the proper body notches 25. This selection will depend upon the inside diameter of the casing to be pulled. Upon engagement, all the slips will drop down until the bottom of the lower slips 11 engage the top of the fingers 15. Upon lowering the tool string into the well, the cone nut 19 guides the tool into the casing and when the slips are reached, they are pushed back on their seats a distance sufficient to permit full entry into the casing. When the desired casing has been reached, upward movement of the tool will cause downward and outward movement of the slips and their teeth will bite into the casing. Further upward movement of the tool will carry the casing with it to the desired point.

To release the tool from the casing, it is only necessary to give an up jar to the tool, which causes a slight downward movement of the slips 5 and ring 14, and consequently releases the latch 22 from the body. A down jar will then release the slips from the casing and the spring 17 will retract the slips into the position of Fig. 1. The tool may then be lifted from the casing and well.

It will be obvious that many advantages exist in such a construction, not inherent in one where all the slips here constituting a series are made in one piece. As these parts must be heat treated to great hardness it is necessary that they be of such dimensions as to prevent warping during the treatment, yet they must be of maximum length to insure proper engagement with the casing. To make a slip long enough for the later purpose causes difficulties in the former particular. This is obviated by providing a series of independent slips which may be of much less extent for heat treating, yet when interlocked on the tool body, have all the advantages of a single longer slip.

The tie ring 13 is of particular advantage in that uneven expansion is prevented with its accompanying danger of causing a breakage of the casing at the point of greatest slip expansion. The tie ring causes all the series of slips to move downward or upward as the case may be in a simultaneous and similar movement.

While I have illustrated a particular embodiment of the invention in the claims, yet obviously I do not wish to be limited thereto, but only to the scope of the claims.

What I claim is:

1. A spear comprising a body, a series of seats longitudinally arranged thereon, each seat being at an angle to the body axis, and a series of slips engaging the series of seats and capable of movement thereon, the series of slips having an uninterrupted outer serrated face, the individual slips of the series being detachably connected together.

2. A spear comprising a body, a series of seats longitudinally arranged thereon, each seat being at an angle to the body axis, a series of slips engaging the series of seats and capable of movement thereon, the series of slips having an uninterrupted outer serrated face, each slip of the series being detachably interlocked to its fellow.

3. A spear comprising a body, a series of seats longitudinally arranged thereon, each seat being at an angle to the body axis, a series of slips engaging the series of seats and movable thereon, the series of slips having an uninterrupted outer serrated face, a portion of one of the individual slips underlying a portion of its fellow.

4. A spear comprising a body, a plurality of longitudinally arranged series of seats thereon, each seat arranged at an angle to the axis of the body, and a plurality of interlocking series of slips, the series of slips having an uninterrupted outer serrated face each series of slips engaging a series of seats and capable of movement thereon.

5. A series of slips for a spear comprising detachably interlocked individual slips, each having toothed outer portions the toothed portions of the series forming a continuous toothed surface.

6. A series of slips for a spear comprising detachably interlocked individual slips, each slip being toothed throughout its outer face the toothed portions of the series forming a continuous toothed surface.

7. A slip for a spear comprising a body portion having a toothed outer face, and means at one end of the body for detachably gripping another slip.

8. In a spear for recovering lost parts in a well, a combination of a body having upper and lower ways, upper jaws carried in said upper ways, lower jaws carried by said lower ways, said jaws being movable along said ways, and means operable to move said jaws along said ways, said upper and lower jaws being interlocked together.

9. In a spear for recovering lost parts in a well, a combination of a body having upper and lower ways, upper jaws carried in said upper ways, lower jaws carried by said lower ways, said jaws being movable along said ways, interlocking means for interlocking adjacent upper and lower jaws together, and means operable to move said jaws along said ways.

10. In a spear for recovering lost parts in a well, a combination of a body having upper and lower tapered ways, jaws carried by said upper and lower ways, said jaws being movable along said ways to engage the part lost in said well, and means for positively actuating said jaws to move them into retracted position the upper and lower jaws being interlocked together.

11. A series of slips for a casing spear comprising individual slips detachably connected and interlocked together.

12. A series of slips for a casing spear comprising individual slips detachably connected and interlocked together in overlapping relation.

13. A series of slips for a casing spear comprising individual slips detachably connected and interlocked together, each slip having an outer serrated portion and an inner plane portion.

14. A casing spear comprising a body having an upper and a lower slip seat, a slip on each seat, the two slips being detachably interlocked together in overlapping relation.

In testimony whereof, I have hereunto subscribed my name this 21st day of May, 1929.

ORDA D. NUTTER.